US008348791B2

(12) United States Patent
Lee

(10) Patent No.: US 8,348,791 B2
(45) Date of Patent: Jan. 8, 2013

(54) TENSIONER

(75) Inventor: Po-Yi Lee, West Covina, CA (US)

(73) Assignee: Po-Yi Lee, West Covina, CA (US)

( * ) Notice: Subject to any disclaimer, the term of this patent is extended or adjusted under 35 U.S.C. 154(b) by 751 days.

(21) Appl. No.: 12/512,035

(22) Filed: Jul. 30, 2009

(65) Prior Publication Data

US 2010/0029425 A1    Feb. 4, 2010

(30) Foreign Application Priority Data

Aug. 4, 2008   (CN) .......................... 2008 1 0131290

(51) Int. Cl.
*F16H 7/08* (2006.01)
(52) U.S. Cl. ........................................................ 474/111
(58) Field of Classification Search .................. 474/100, 474/109, 110, 111, 140
See application file for complete search history.

(56) References Cited

U.S. PATENT DOCUMENTS

| 7,850,559 | B2 * | 12/2010 | Botez et al. | 474/110 |
| 2004/0067805 | A1 * | 4/2004 | Hellmich et al. | 474/101 |
| 2004/0092350 | A1 * | 5/2004 | Hashimoto et al. | 474/110 |
| 2005/0239589 | A1 * | 10/2005 | Seungpyo et al. | 474/110 |
| 2010/0022339 | A1 * | 1/2010 | Barve | 474/111 |

* cited by examiner

*Primary Examiner* — Michael Mansen
*Assistant Examiner* — Robert T Reese
(74) *Attorney, Agent, or Firm* — CKC & Partners Co., Ltd.

(57) ABSTRACT

A tensioner includes a base, a piston, a rack, a stopping device, a first and a second flexible device. The surface of the base includes a first, a second, a third, and a fourth recess portion vertically connecting the third with the second recess portion. The rack disposed in the second recess portion has one ending outside the base to extend and connect to one ending of the piston. The stopping device axially disposed in the fourth recess portion has a work surface and a first connecting surface disposed on sides of two endings thereof. Two sticking portions are disposed on opposite edges of the first connecting surface. A turning mechanism is disposed on the ending of stopping device, which has the sticking portions. The second flexible device disposed in the third recess portion contacts the ending of stopping device, where the work surface is disposed.

8 Claims, 13 Drawing Sheets

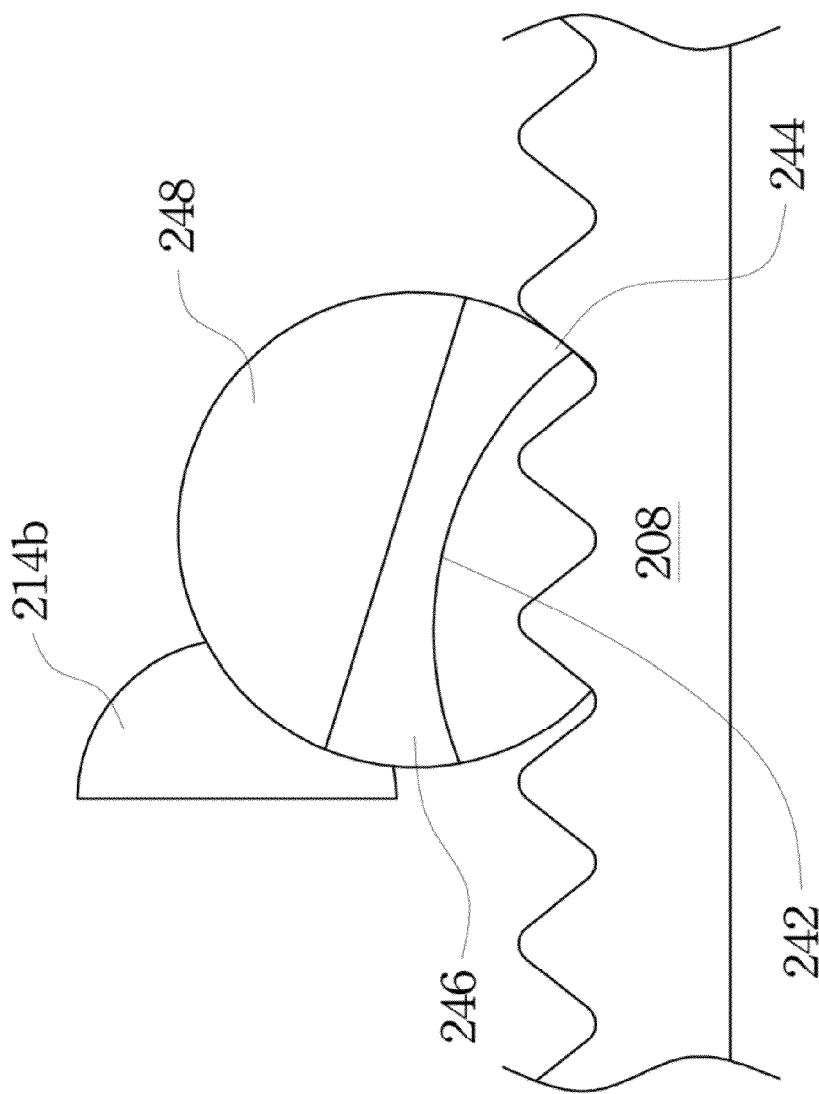

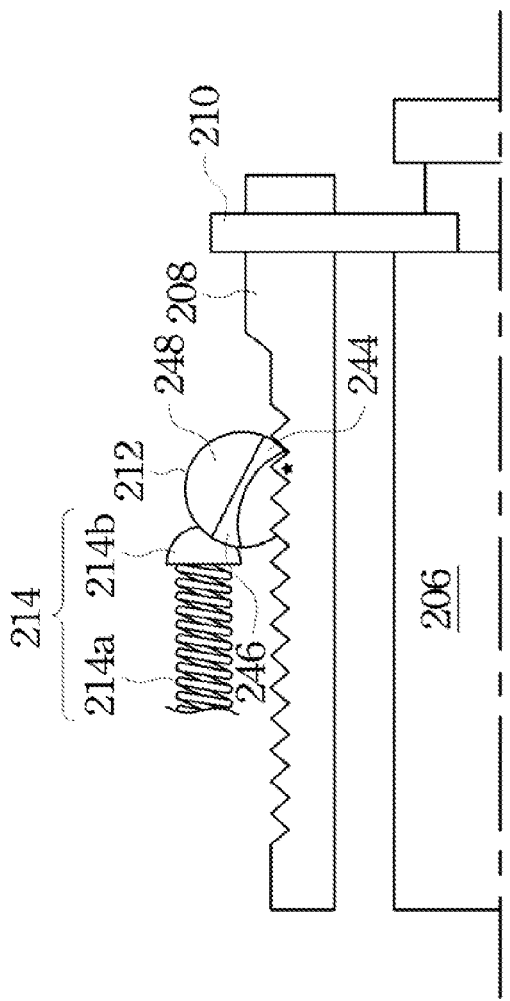
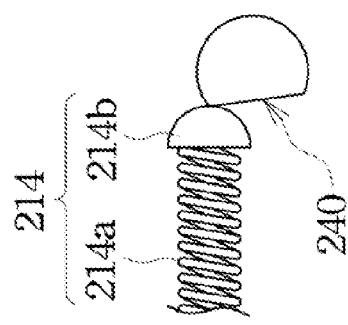
FIG. 5A
FIG. 5A'

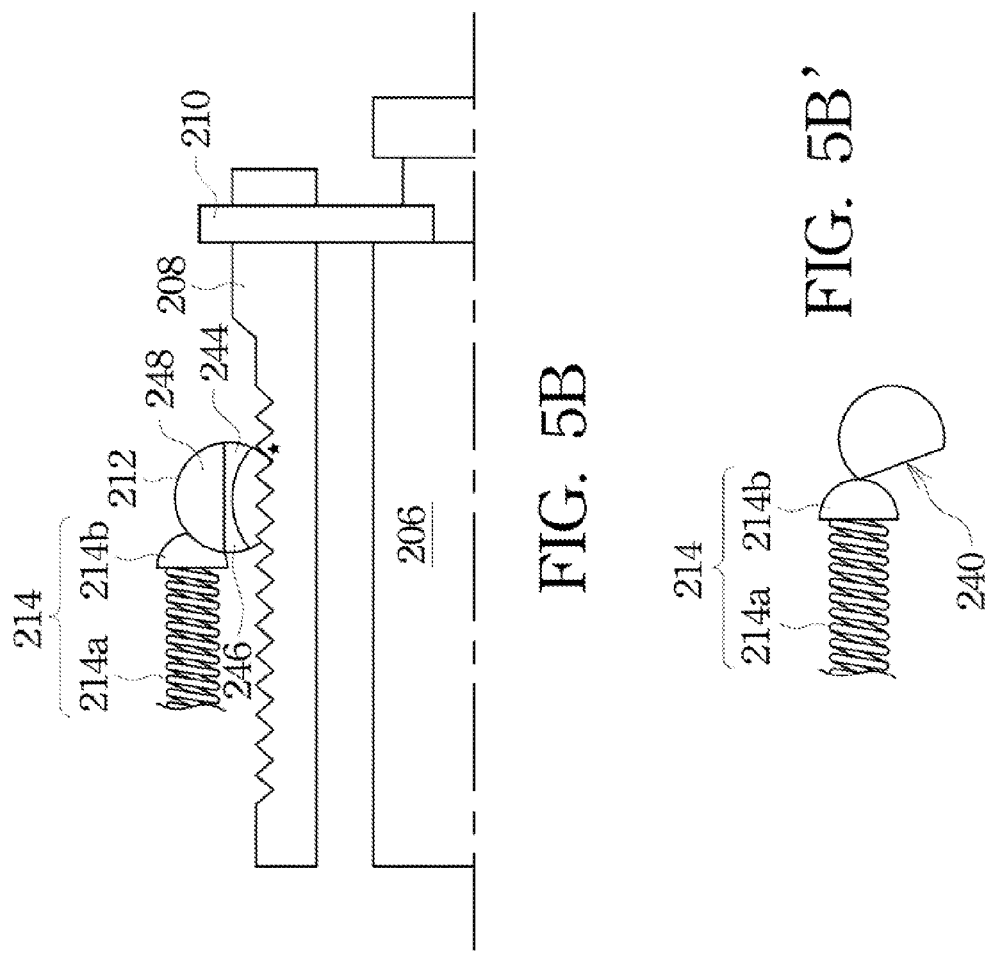

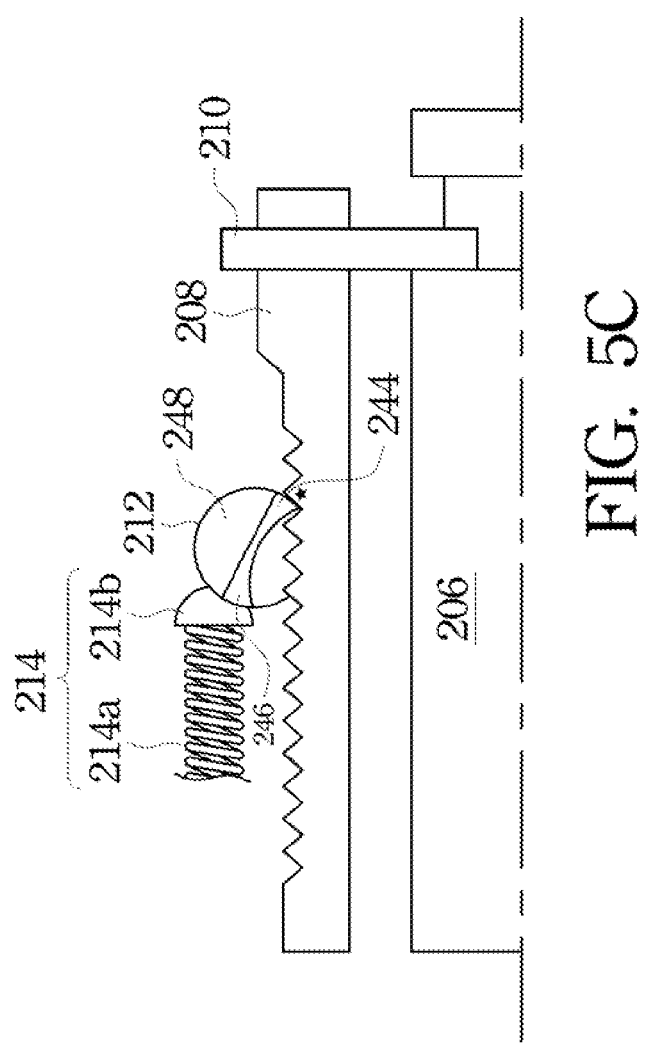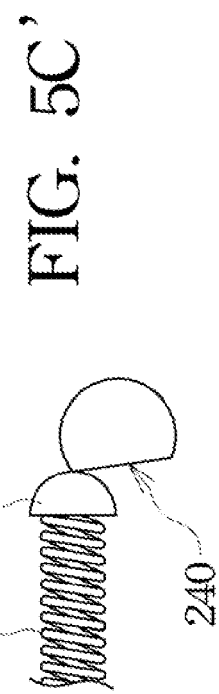

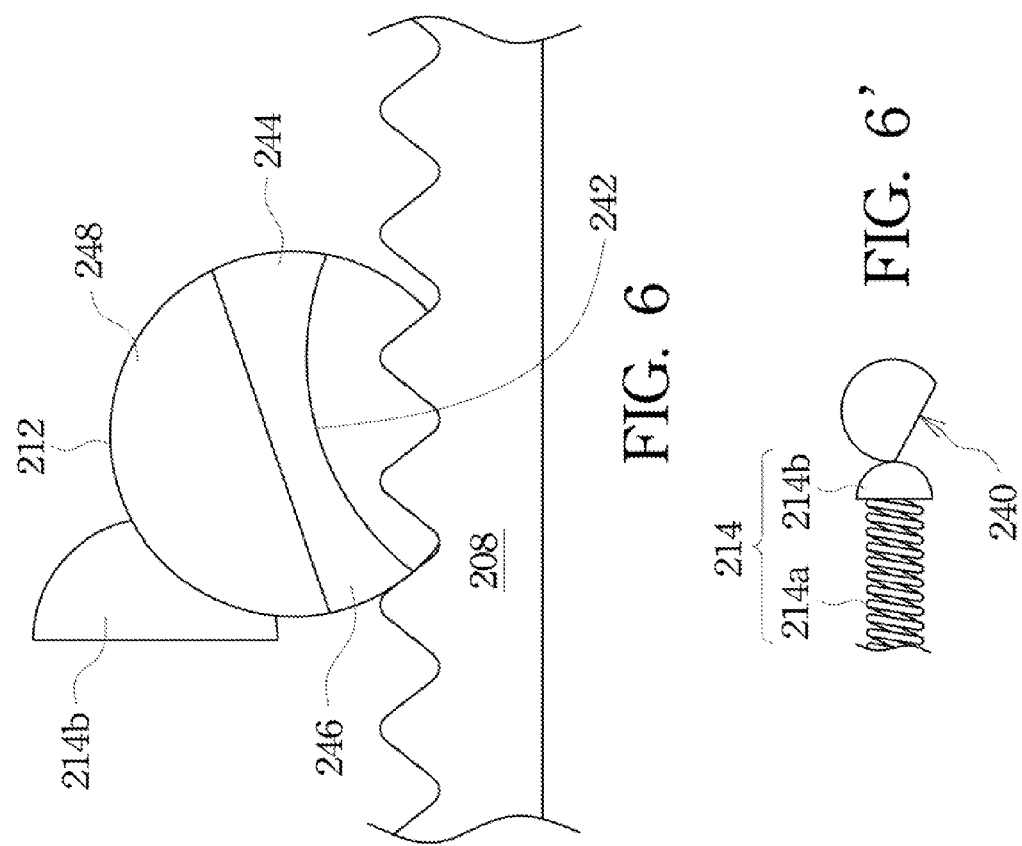

TENSIONER

RELATED APPLICATIONS

This application claims priority to Chinese Patent Application Number 200810131290.8, filed Aug. 4, 2008, which is herein incorporated by reference.

BACKGROUND

1. Field of Invention

The present invention relates to a tensioner, and more particularly to a it tensioner applied in power or transmission devices.

2. Description of Related Art

A tensioner is usually applied to a member in a power or transmission system, such as an endless flexible member for transmitting the power of a shaft in a power system. In order to transmit power smoothly and prevent vibration caused by change of tension of the endless flexible member, the tensioner is usually installed on the loose side of the endless flexible member to adjust tension of the endless flexible member automatically.

Please refer to FIG. 1, which is a cross section view showing a conventional tensioner. The tensioner 100 includes a base 102, a piston 104, a rack 106, a ratchet 108, a spring 110, a spring 112, and a pin (not shown). The rack 106 is disposed on the side wall of the piston 104 along a direction parallel to the central axis thereof. The spring 110 and the piston 104 are disposed in a recess portion of the base 102. The ratchet 108 is pivotally connected to the base 102 so that the lower portion of the ratchet 108 can mesh with a tooth of the rack 106. The ending of the pivoting shaft of the ratchet 108 is connected to a plate 114 disposed and extending on the surface of base 102. The plate 114 includes a through hole 116. A fastening hole (not shown) is disposed on a location of the base 102 corresponding to the location of the through hole 116.

When the manufacture of the tensioner 100 is completed in a factory, the pin of the tensioner 100 passes through the through hole 116 and stays in the fastening hole of the base 102 corresponding to the through hole 116. At this time, the ratchet 108 cannot rotate around the pivoting shaft, and the lower portion of the ratchet 108 meshes with a tooth of the rack 106, and the piston 104 stays in the recess portion of the base 102 and in a static state. This arrangement can make the piston 104 temporarily stay in the recess portion of the base 102, and can prevent the piston 104 from separating from the recess portion of the base 102. When the tensioner 100 is being assembled, the tensioner 100 is first placed in a predetermined location, and then the pin is pulled out so that the piston 104 is pushed away from the recess portion of the base 102 by springback force of the spring 110. When the piston 104 contacts the device, such as the endless flexible member, in order to control the tension of the device, the springback force for pushing the piston 104 will be offset by the tension of the device and stays in an equilibrium state. When the device is in operation, the variations of the tension of the device will push the piston 104 to move slightly such that the variations will be balanced automatically.

When the device is in repair or adjustment, if the piston 104 of the tensioner 100 is in need of staying at the original location set by a factory or being pushed back into the recess portion of the base 102, the upper portion of the ratchet 108 is pushed to be without mesh engagement with a tooth of the rack 106 and then the piston 104 is pushed back into the base 102. Thereafter, a specific pin, i.e. the pin including a diameter fitting with the diameter of the through hole 116 in the plate, is used to fix the piston 104. This structure is inconvenient for operators' manipulation. When the operation is improper, the piston 104 will be rapidly pushed along the direction away from the base 102 due to springback force of the spring 110, which, in turn, makes the operators get injured or damages some goods.

Hence, there is a need to provide a novel tensioner for improving convenience and safety in operation.

SUMMARY

It is an object of the present invention to provide a tensioner having a stopping device instead of a ratchet. When it is needed to adjust or repair the device including the tensioner, if the piston of the tensioner is in need to be pushed back into the base, such that the device including the tensioner is in a repaired state, it will only be needed to turn the stopping device from one location in operation to another one, thereby fixes the piston of the tensioner.

To achieve the above listed and other objects, a tensioner according to one embodiment of the present invention includes a base, a first flexible device, a piston, a rack, a stopping device and a second flexible device. The surfaces of the base include a first, a second, a third, and a fourth recess portion. The surface includes the third recess portion is opposite to the surface includes the first and the second recess portion. The fourth recess portion vertically connects the third recess portion with the second recess portion. The first flexible device is disposed in the first recess portion. Furthermore, the piston is also disposed in the first recess portion and contacts the first flexible device. The piston has a first ending protruding outside the first recess portion. The rack is disposed in the second recess portion and has a second ending protruding outside the second recess portion. The second ending of the rack extends and connects to the first ending of the piston so that the piston can drive the rack. The stopping device is axially disposed in the fourth recess portion, and has a third ending and a fourth ending. A work surface is disposed on one side of the third ending of the stopping device, and a first connecting surface is disposed on one side of the fourth ending of the stopping device, wherein a first sticking portion and a second sticking portion are disposed on two opposite edges of the first connecting surface, and a turning mechanism for turning the stopping device is disposed on the fourth ending. The second flexible device is disposed in the third recess portion and contacts the third ending of the stopping device. As the first sticking portion meshes with the teeth of the rack, the second flexible device contacts the work surface of the third ending, and the first flexible device pushes the piston away from the first recess portion. As the second sticking portion meshes with the teeth of the rack, the first flexible device cannot push the piston away from the first recess portion.

The present invention has the advantage of improving the convenience of operating the tensioner by using a stopping device instead of a ratchet. Moreover, a stopping device is used to avoid the piston of the tensioner from ejecting out of the base of the tensioner, thereby preventing the operators from getting injured or some goods from being damaged. Therefore, indeed, it can be improved to operate a tensioner conveniently and safely by using a stopping device instead of a ratchet.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the accompanying figures:

FIG. 4C is a side view showing the arrangement of the stopping device and the rack of FIG. 4A;

FIG. 5A, FIG. 5B and FIG. 5C are side views showing the arrangements of the stopping device and the rack in various stages, as the piston being pushed out of the base;

FIG. 5A', FIG. 5B' and FIG. 5C' are side views showing the arrangements of a contact device and a work surface of the stopping device in various stages, as the piston being pushed out of the base;

FIG. 6 is a side view showing the arrangement of the stopping device and the rack, as the piston staying in the base; and FIG. 6' is a side view showing the arrangement of the contact device and the work surface of the stopping device, as the piston staying in the base.

DESCRIPTION OF THE PREFERRED EMBODIMENTS

Figure 1:
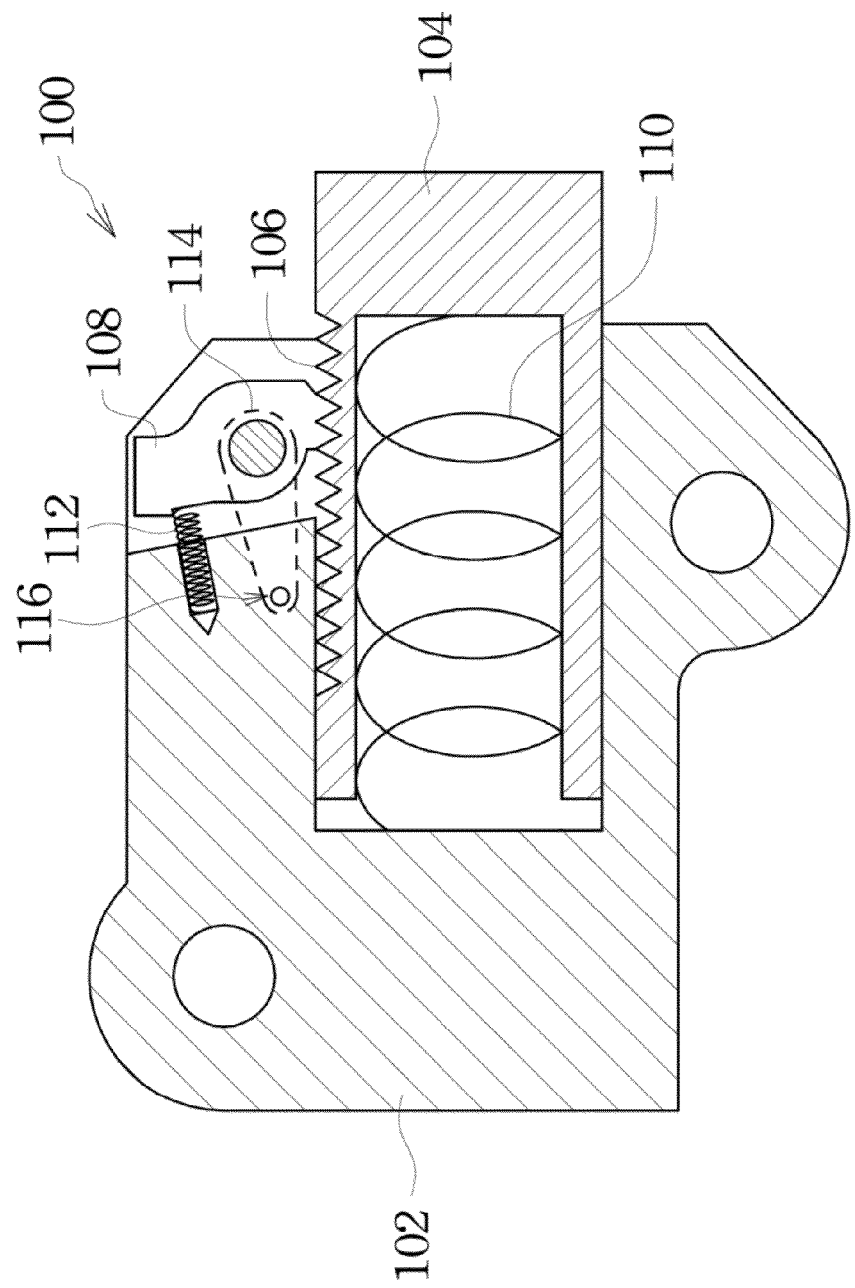
FIG. 1 is a cross section view showing a conventional tensioner.
Figure 2:
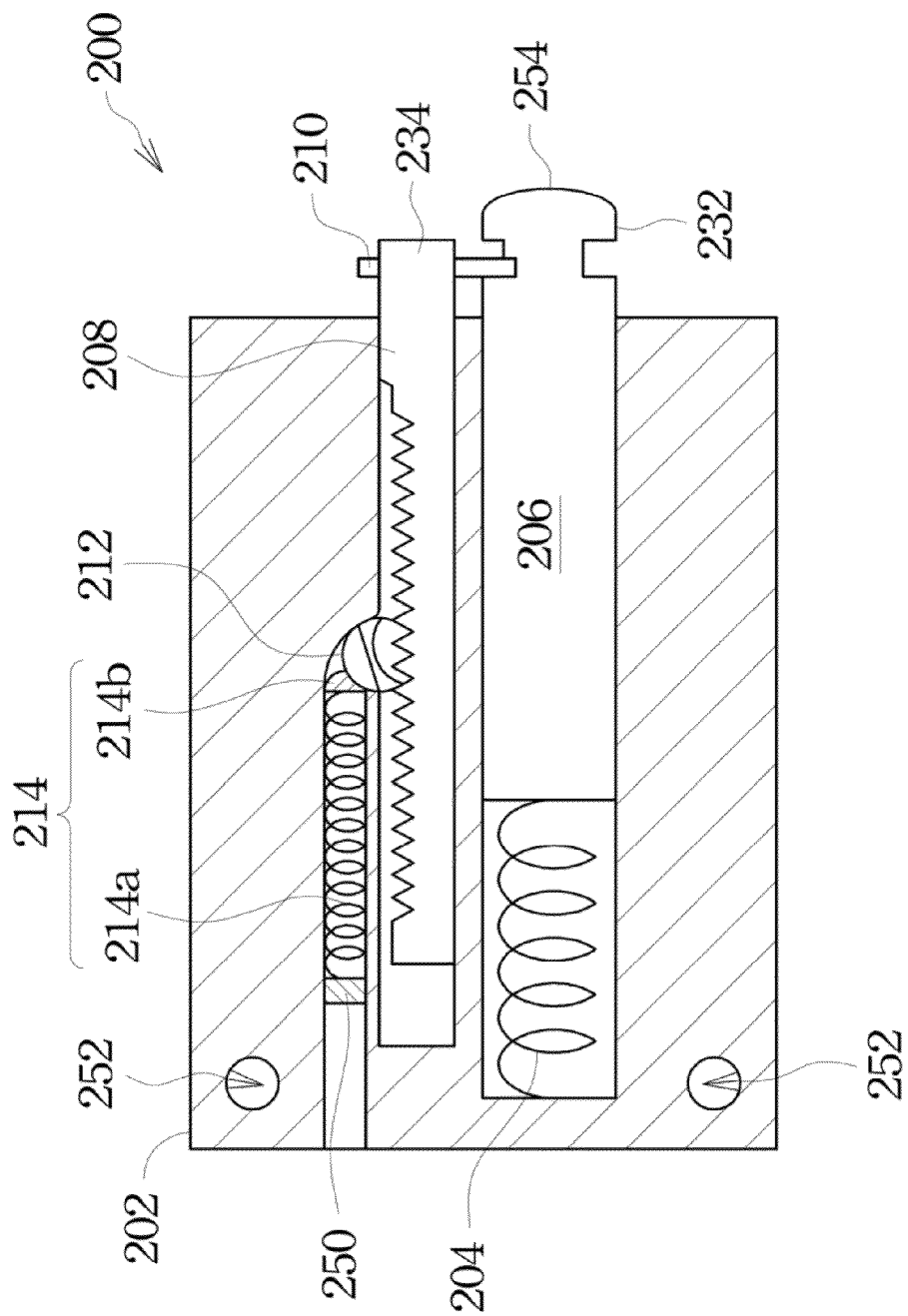
FIG. 2 is a cross section view showing a tensioner according to one embodiment of the present invention.

Referring to FIG. 2. FIG. 2 shows a tensioner 200 according to one embodiment of the present invention. The tensioner 200 includes a base 202, a first flexible device 204, a piston 206, a rack 208, a stopping device 212 and a second flexible device 214.

Figure 3A:
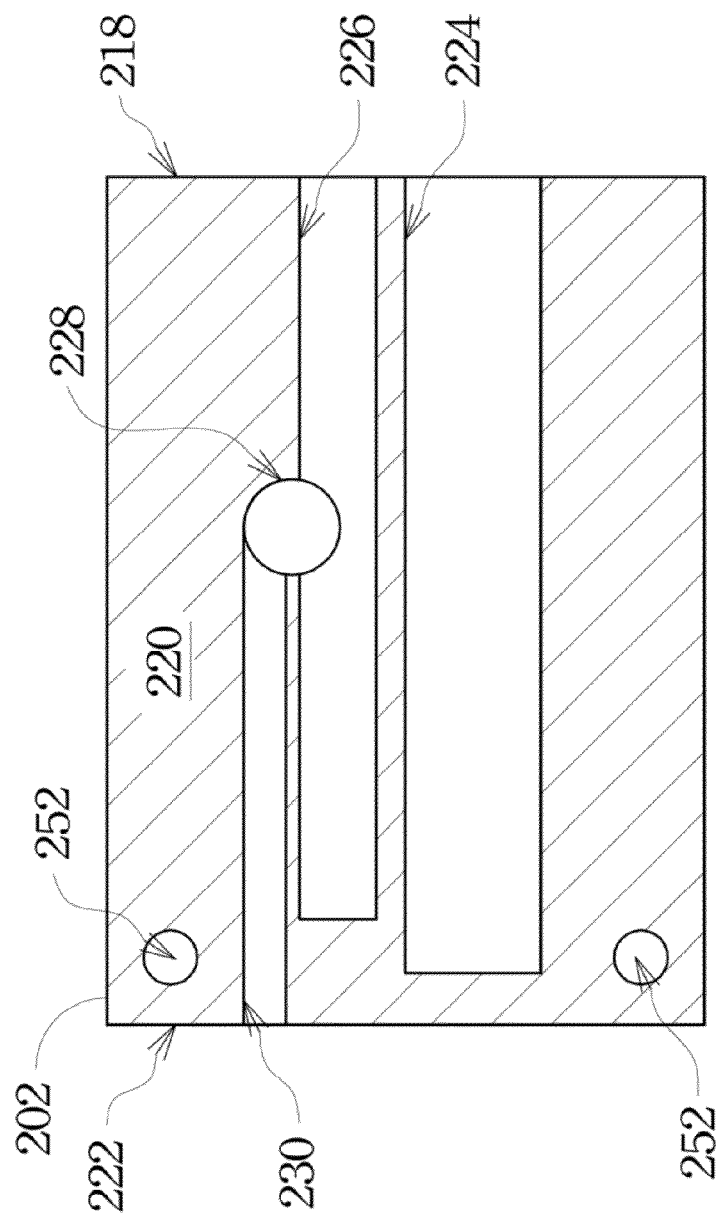
FIG. 3A is a cross section view showing a base of the tensioner of FIG. 2.
Figure 3B:
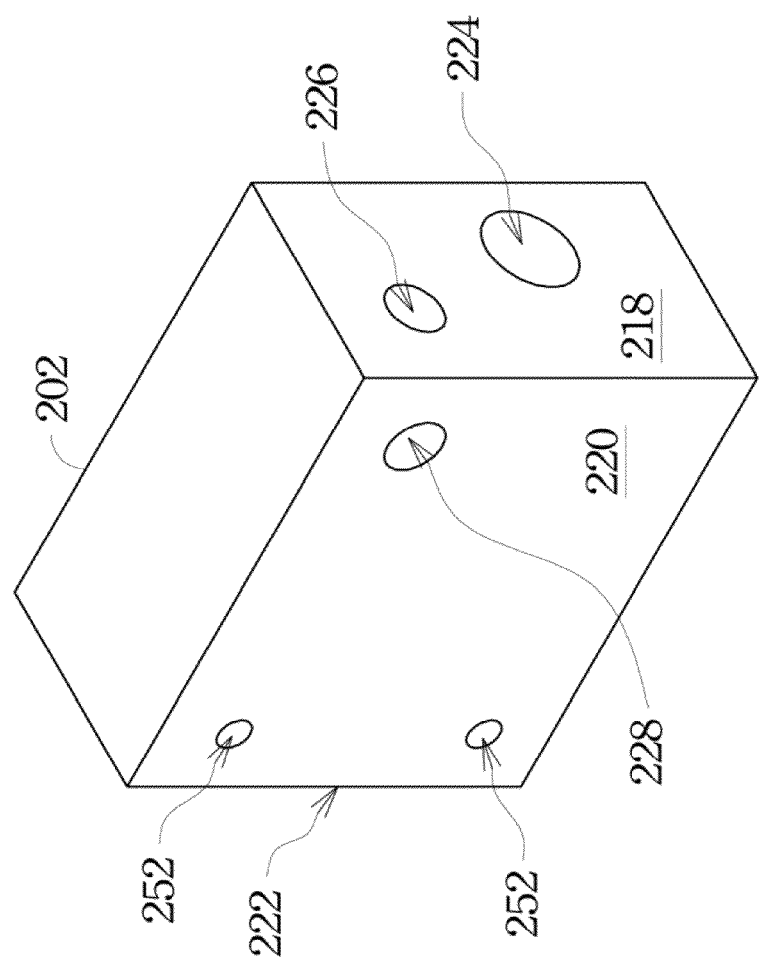
FIG. 3B is a pictorial view showing the base of the tensioner of FIG. 2.

Referring to FIG. 3A and FIG. 3B, FIG. 3A and FIG. 3B respectively show a cross section view and a pictorial view of the base 202 of the tensioner 200 shown in FIG. 2. The base 202 includes a first surface 218, a second surface 220 and a third surface 222, which are connected in sequence. A first recess portion 224 and a second recess portion 226 are disposed on the first surface 218, a fourth recess portion 228 is disposed on the second surface 220, and a third recess portion 230 (see FIG. 3A) is disposed on the third surface 222. The third surface 222 on which the third recess portion 230 disposed is opposite to the first surface 218 on which the first recess portion 224 and the second recess portion 226 are disposed, and the fourth recess portion 228 vertically connects the second recess portion 226 with the third recess portion 230. In this embodiment, a central axis of the first recess portion 224, a central axis of the second recess portion 226 and a central axis of the third recess portion are parallel to one another.

Referring to FIG. 2 and FIG. 3A again. The first flexible device 204 is disposed in the first recess portion 224. The piston 206 is also disposed in the first recess portion 224 like the first flexible device 204, and the piston 206 contacts the first flexible device 204 in the first recess portion 224. Moreover, the piston 206 has a first ending 232 protruding outside the first recess portion 224. In this embodiment, the first flexible device 204 is a ring-shaped spring, but not intended to limit the invention to this specific embodiment illustrated. The ring-shaped spring can be instead of other flexible devices, and amounts of the first flexible device 204 vary with springback force needed.

Referring to FIG. 2 and FIG. 3A. The rack 208 is disposed in the second recess portion 226, and has a second ending 234 protruding outside the second recess portion 226.

Figure 4A:
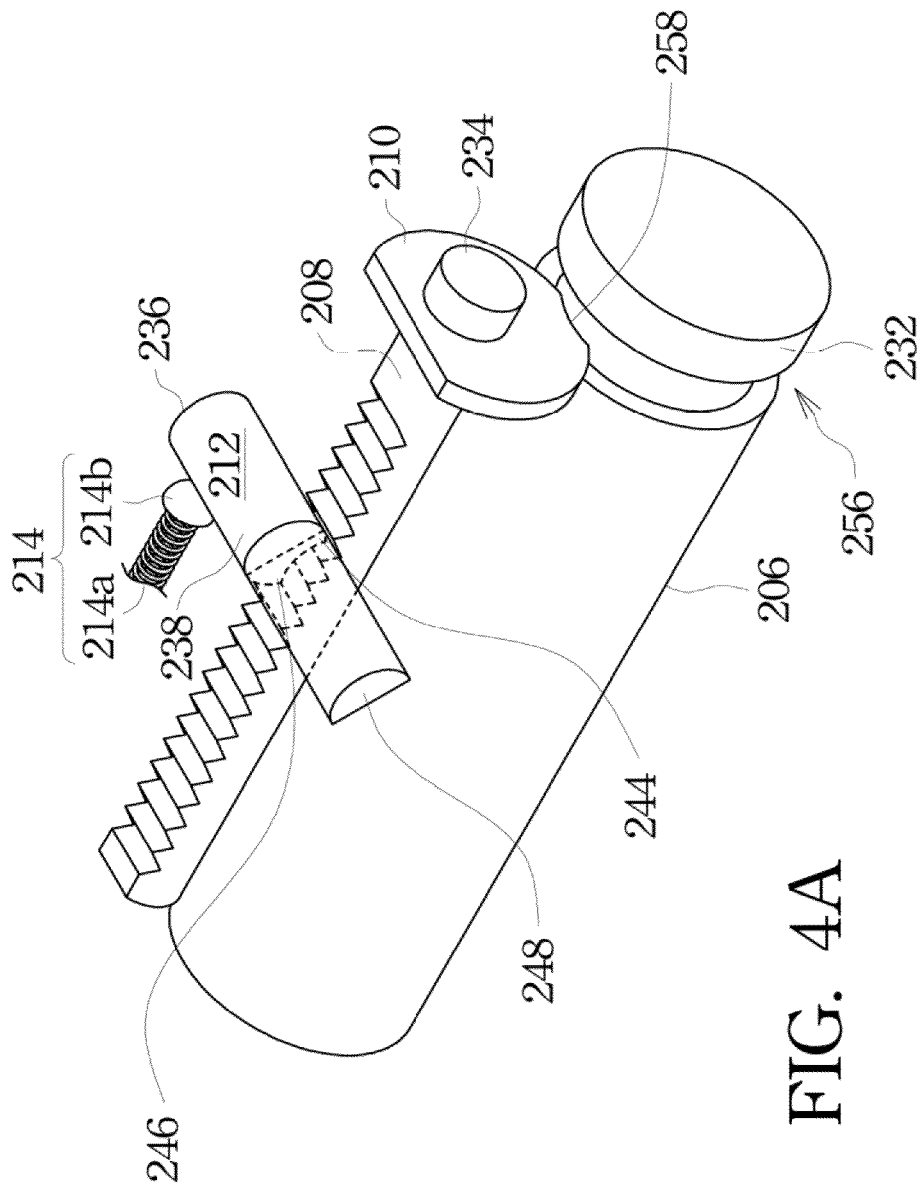
FIG. 4A is a pictorial view showing the assembly of a piston, a rack, a stopping device, and a flexible device according to the embodiment of FIG. 2.

Referring to FIG. 2 and FIG. 4A, FIG. 4A is a pictorial view showing the assembly of a piston, a rack, a stopping device, and a flexible device according to the embodiment of FIG. 2. In this embodiment, the second ending 234 of the rack 208 extends and connects to the first ending 232 of the piston 206 via a connecting device 210 so that the piston 206 can drive the rack 208. In certain embodiments, the connecting device 210 for connecting the second ending 234 of the rack 208 with the first ending 232 of the piston 206 can be instead by other structures, but is not intended to limit the invention to this specific embodiment illustrated.

Figure 4B:
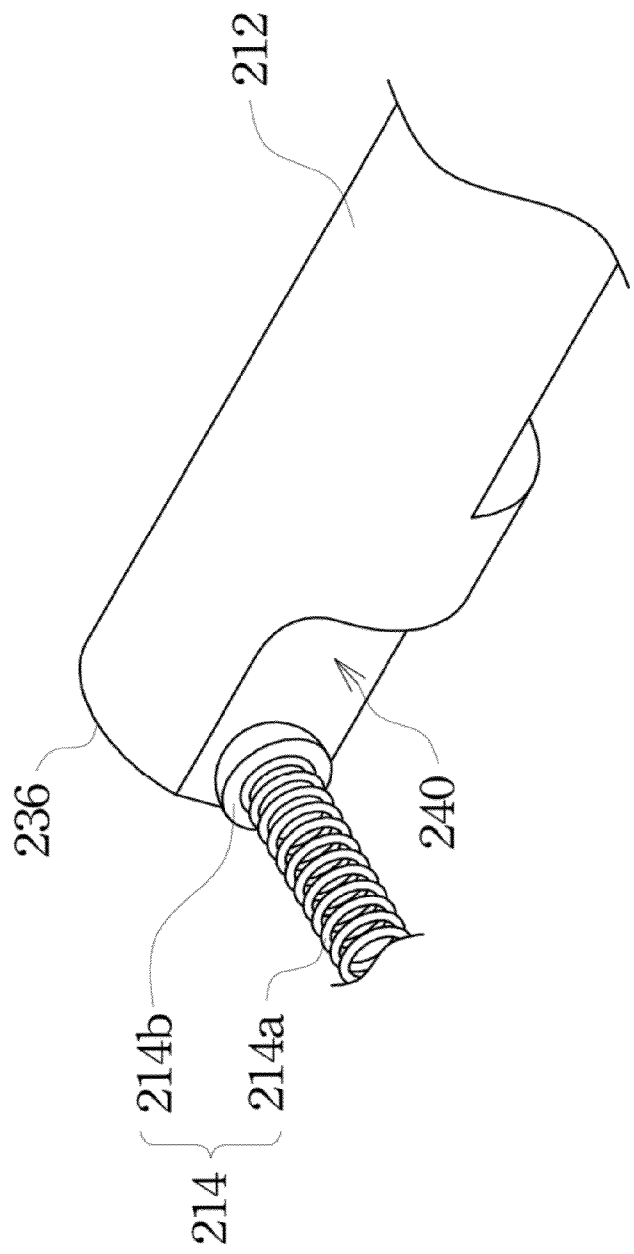
FIG. 4B is a pictorial view showing the arrangement of the stopping device and the flexible device of FIG. 4A.

Please refer to FIG. 2, FIG. 4A, FIG. 4B and FIG. 4C, wherein FIG. 4B is a pictorial view showing the arrangement of the second flexible device 214 and the stopping device 212 of FIG. 4A, and FIG. 4C is a side view for showing the arrangement of the stopping device 212 and the rack 208 of FIG. 4A. The stopping device 212 is axially disposed in the fourth recess portion 228 (see FIG. 3A), and has a third ending 236 and a fourth ending 238. A work surface 240 is disposed on one side of the third ending 236 (see FIG. 48). Besides, a first connecting surface 242 is disposed on one side of the fourth ending 238 (see FIG. 4C). The first connecting surface 242 is produced by cutting some portion of the pillar of the stopping device 212 from the top surface of the fourth ending 238 to a predetermined location along the central axis of the pillar of the stopping device 212, so that a normal line of the first connecting surface 242 is perpendicular to the central axis of the pillar of the stopping device 212. A first sticking portion 244 and a second sticking portion 246 are disposed on two opposite edges of the first connecting surface 242 (see FIG. 4C). In this embodiment, the first sticking portion 244 and the second sticking portion 246 defined by the first connecting surface 242, the top surface of the fourth ending 238, and the side of the pillar of the stopping device 212 form two acute angle structures, but the structure of the sticking portions is not intended to limit the invention to this specific embodiment illustrated. In certain embodiments, it is the only limitation of the structure of the sticking portions to make the first sticking portion 244 and the second sticking portion 246 mesh with a tooth of the rack 208. The stopping device 212 further includes a turning mechanism 248 disposed on the fourth ending 238, and the turning mechanism 248 is provided for operators to relatively conveniently turn the stopping device 212 so as to control the state of the tensioner 200. In this embodiment, the turning mechanism 248 shown in FIG. 4A is a protruding portion disposed on the fourth ending 238, and protrudes outside the second surface 220 (see FIG. 3B). Through this design, a user can utilize a simple tool, such as a clincher, to secure the aforementioned protruding portion to turn the stopping device 212. In certain embodiments, the turning mechanism 248 can be disposed in the fourth recess portion 228 and does not protrude outside the second surface 220 of the base 202. In another embodiment, the structure of the turning mechanism 248 can be instead by other structures, such as a linear groove disposed on the top surface of the fourth ending 238 of the stopping device 212. In the embodiment shown in FIG. 4A to FIG. 4C, the stopping device 212 is a circular pillar. In certain embodiments, the structure of the stopping device 212 can be replaced by other structures, such as a polyhedron pillar, a rectangular pillar, a triangular pillar, a pentagon pillar, or a hexagonal pillar.

Please refer to FIG. 2 and FIG. 3A. The second flexible device 214 is disposed in the third recess portion 230. In this embodiment, first, the second flexible device 214 is disposed in the third recess portion 230, and then a stop 250 is fixed in the third recess portion 230 for securing the second flexible device 214 inside the third recess portion 230 so that the second flexible device 214 cannot be separated from the third recess portion 230. In certain embodiments, the second flexible device 214 can be secured in the third recess portion 230 through other methods, such as a welding. The second flexible device 214 contacts the third ending 236 of the stopping device 212. In this embodiment, the second flexible device 214 includes a ring-shaped spring 214a like one included in the first flexible device 204, and further includes a contact device 214b. The ring-shaped spring 214a can be instead by other flexible devices, but is not intended to limit the invention to this specific embodiment illustrated, and amounts of the ring-shaped spring 214a vary with springback force needed. In this embodiment, the contact device 214b has an arc surface. The second flexible device 214 contacts the work surface 240 of the third ending 236 of the stopping device 212 via the arc surface of the contact device 214b. In this embodiment, the structure of the contact device 214b is a hemisphere, and in certain embodiments, the structure of the contact device 214b can be a sphere.

Refer to FIG. 5A to FIG. 5C'. FIG. 5A, FIG. 5B and FIG. 5C are side views showing the arrangements of the stopping device 212 and the rack 208 in various stages, as the piston 206 is being pushed out of the base 202. FIG. 5A', FIG. 5B' and FIG. 5C' are side views showing the arrangements of the contact device 214b and the work surface 240 of the stopping device 212 in various stages, as the piston 206 is being pushed out of the base 202. When the piston 206 is pushed out of the base 202, a user has to utilize the turning mechanism 248 to turn the stopping device 212 to a location shown in FIG. 5A, such that the first sticking portion 244 meshes with the teeth of the rack 208, and the contact device 214b contacts the work surface 240 at this time, as shown in FIG. 5A'. Due to springback force of the first flexible device 204, the piston 206 is pushed toward the right side of FIG. 5A, and then the protrusion of the tooth marked by a star and shown in FIG. 5A lifts up the first sticking portion 244 to turn the stopping device 212 counterclockwise to form the arrangement shown in FIG. 5B and FIG. 5B'. When the protrusion of the tooth marked by the star keeps moving toward the right, the second flexible device 214 imparts a clockwise torque to the stopping device 212 via a contact between the contact device 214b and the work surface 240 (referring to FIG. 5C'), such that the first sticking portion 244 is disposed in the recess portion located left to the tooth marked by the star to form the arrangement shown in FIG. 5C. Before the piston 206 suffers a resistance, the piston 206 continuously moves along a direction away from the base 202, and the second flexible device 214, the stopping device 212 and the rack 208 continuously repeat the aforementioned motions shown in FIG. 5A to FIG. 5C.

When the piston 206 contacts the device whose tension is in need of control, due to the tension of the device, a force for pushing the piston 206 into the base 202 is induced. At this time, the force for pushing the piston 206 into the base 202 is transmitted to the rack 208 via the connecting device 210. The rack 208 transmits the force for pushing the piston 206 into the base 202 to the stopping device 212 via a mesh engagement between the teeth of the rack 208 and the first sticking portion 244, which, in turn, pushes the stopping device 212 to turn clockwise. Therefore a sticking effect is induced between the first sticking portion 244 and the rack 208 to prevent the piston 206 and the rack 208 from moving into the base 202.

Refer to FIG. 6 and FIG. 6C'. FIG. 6 is a side view showing the arrangement of the stopping device 212 and the rack 208, as the piston 206 staving in the base 202. FIG. 6' is a side view showing the arrangement of the contact device 214b and the work surface 240 of the stopping device 212, as the piston 206 staying in the base 202. When it is needed to repair the device including the tensioner 200 to control tension thereof, first, the piston 206 of the tensioner 200 is in need to be pushed back into the base 202 to release tension applied on the device. At this time, the turning mechanism 248 is used to turn the stopping device 212, such that both the first sticking portion 244 and the second sticking portion 246 do not contact the rack 208, and then a force is applied to the piston 206, which, in turn, make the piston 206 continuously drive the rack 208 into the base 202. After the piston 206 is pushed for some distance toward the inside of the base 202, the turning mechanism 248 is used again to turn the stopping device 212 counterclockwise, such that the second sticking portion 246 of the stopping device 212 meshes with the teeth of the rack 208 to reach a static state. At this time, as shown in FIG. 6', due to no contact between the second flexible device 214 and the work surface 240, the second flexible device 214 cannot effectively turn the stopping device 212 clockwise, and therefore the second sticking portion 246 can effectively mesh with the teeth of the rack 208 to prevent that the piston 206 is pushed along the direction away from the base 202 due to springback force of the first flexible device 204. In certain embodiments, when the second sticking portion 246 of the stopping device 212 meshes with the teeth of the rack 208 to reach a static state, the second flexible device 214 contacts the work surface 240, and the stopping device 212 receives a clockwise torque applied by the second flexible device 214. At the same time, the first flexible device 204 applies a counterclockwise torque to the stopping device 212 via the piston 206, the connecting device 210, and the rack 208. Due to the counterclockwise torque induced by the first flexible device 204 greater than the clockwise torque induced by the second flexible device 214, the teeth of the rack 208 can effectively mesh with the second sticking portion 246 to limit the piston 206 in the base 202, and hence the piston 206 cannot move along a direction away from the base 202.

Please refer to FIG. 2 again. In this embodiment the base 202 further includes a fasten hole 252. In another embodiment, the ending 232 of the piston 206 includes an arc-contact surface 254 used to contact the device whose tension is in need of control.

Please refer to FIG. 4A again. In a certain embodiment, a groove 256 surrounds the ending 232 of the piston 206, the connecting device 210 is a plate, this plate is connect to the second ending 234 of the rack 208, this plate includes a second connecting surface 258, and the second connecting surface 258 is connected to the bottom of the groove 256 of the piston 206. In this embodiment, because the connecting device 210 is merely fixed on the second ending 234 of the rack 208, but not fixed on the ending 232 of the piston 206, so as to move slightly in the groove 256. When the tension of the device contacting the piston 206 increases in a short time, the side wall of the groove 256 contacts the connecting device 210 after the piston 206 moves for a distance of the width of the groove 256. At this time, the rack 208 provides a stopping effect to prevent the piston 206 from moving toward the inside of the base 202.

Figure 7A:
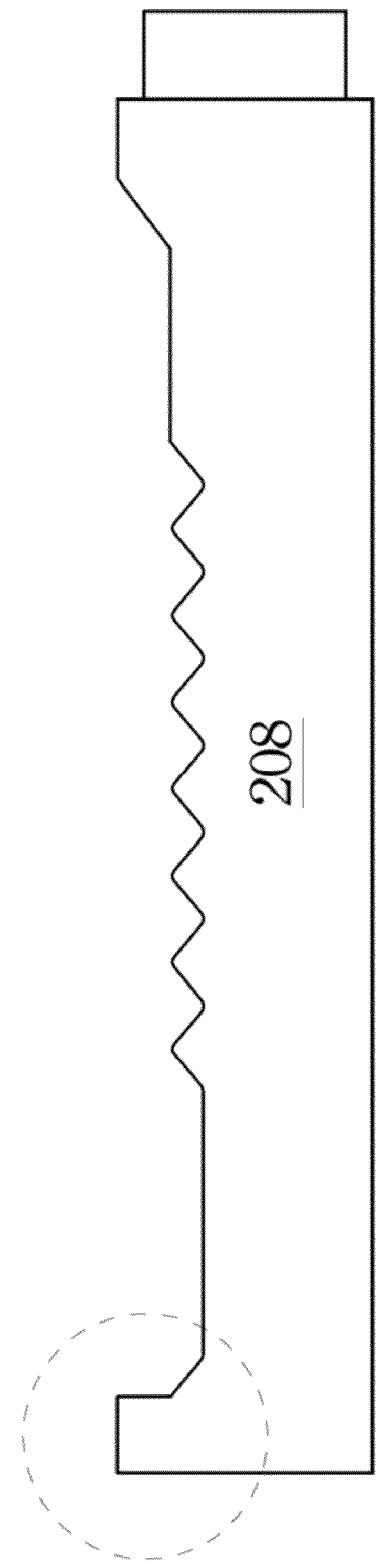
FIG. 7A and FIG. 7B are side views showing interference structures of the racks according to two embodiments of the present invention.
Figure 7B:
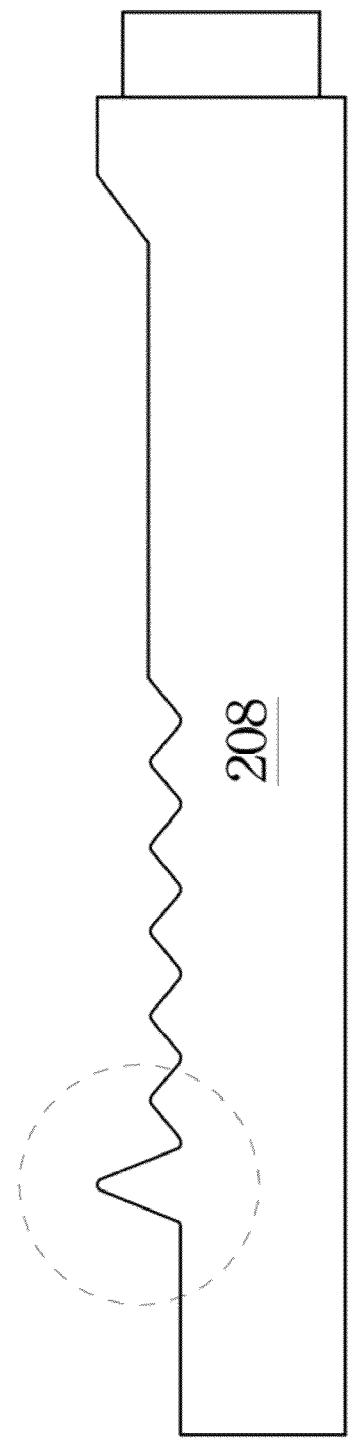

Please refer to FIG. 7A and FIG. 7B, FIG. 7A and FIG. 7B are side views showing interference structures of the racks according to two embodiments of the present invention in the embodiment of FIG. 7A, an interference structure marked by dash line in FIG. 7A protrudes on the ending of the rack 208, and this structure can interfere with the stopping device 212 to prevent the rack 208 from separating from the second recess portion 226 shown in FIG. 3A. In the embodiment of FIG. 7B, an interference structure the rack 208 is shown as the portion marked by dash line in FIG. 7B. The interference structure is a specific tooth protruding from the rack 208, and can interfere with the stopping device 212 to prevent the rack 208 from separating from the second recess portion 226 shown in FIG. 3A.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A tensioner comprising:
    a base having a first recess portion, a second recess portion, a third recess portion, and a fourth recess portion on surfaces of the base, wherein the fourth recess portion vertically connects the third recess portion with the second recess portion, and a central axis of the first recess portion, a central axis of the second recess portion, and a central axis of the third recess portion are parallel to one another;
    a first flexible device disposed in the first recess portion;
    a piston disposed in the first recess portion and contacting the first flexible device, wherein the piston has a first ending protruding outside the first recess portion;
    a rack disposed in the second recess portion and having a second ending protruding outside the second recess portion, wherein the second ending extends and connects to the first ending of the piston so that the piston can drive the rack;
    a stopping device axially disposed in the fourth recess portion, and having a third ending and a fourth ending, wherein a work surface is disposed on one side of the third ending, a first connecting surface is disposed on one side of the fourth ending, a first sticking portion and a second sticking portion are disposed on two opposite edges of the first connecting surface, and a turning mechanism for turning the stopping device is disposed on the fourth ending; and
    a second flexible device disposed in the third recess portion and contacting the third ending of the stopping device;
    wherein as the first sticking portion meshes to the teeth of the rack, the second flexible device contacts the work surface of the third ending, and the first flexible device pushes the piston away from the first recess portion;
    wherein as the second sticking portion meshes with the teeth of the rack, the first flexible device cannot push the piston away from the first recess portion.

2. The tensioner of claim 1, wherein as the second sticking portion meshes with the teeth of the rack, the second flexible device cannot contact the work surface.

3. The tensioner of claim 1, wherein the stopping device is a pillar-type stopping device, and the pillar-type stopping device is a circular pillar, a rectangular pillar, or a polyhedron pillar.

4. The tensioner of claim 1, wherein the fourth ending of the stopping device protrudes outside the base.

5. The tensioner of claim 1, wherein the turning mechanism is a linear groove disposed on the top surface of the fourth ending.

6. The tensioner of claim 1, wherein the second flexible device includes a contact device having an arc surface, and the second flexible device contacts the third ending of the stopping device via the arc surface of the contact device.

7. The tensioner of claim 6, wherein the contact device is a sphere or a hemisphere.

8. The tensioner of claim 1, wherein an interference structure disposed on a teeth portion where the teeth of the rack are located is used to interfere with the stopping device so that the rack cannot be separated completely from the second recess portion.

* * * * *